(12) United States Patent
Jackson

(10) Patent No.: US 6,611,139 B1
(45) Date of Patent: Aug. 26, 2003

(54) THREE DIMENSIONAL POSITIONING DEVICE

(75) Inventor: Rodney Philip Jackson, Southport (GB)

(73) Assignee: Hall Effect Technologies Limited, Chesire (GB)

(*) Notice: Subject to any disclaimer, the term of this patent is extended or adjusted under 35 U.S.C. 154(b) by 0 days.

(21) Appl. No.: 09/367,155
(22) PCT Filed: Feb. 9, 1998
(86) PCT No.: PCT/GB98/00267
§ 371 (c)(1),
(2), (4) Date: Nov. 3, 1999
(87) PCT Pub. No.: WO98/35315
PCT Pub. Date: Aug. 13, 1998

(30) Foreign Application Priority Data

Feb. 8, 1997 (GB) ............................................. 9702614
Jun. 21, 1997 (GB) ............................................. 9713027

(51) Int. Cl.[7] .............................. G01B 7/30; G09G 5/08
(52) U.S. Cl. .............................. 324/207.2; 324/207.24; 324/207.25; 324/207.23; 345/163; 200/6 A
(58) Field of Search ........................ 324/207.2, 207.21, 324/207.22, 207.23, 207.24, 207.25; 74/471; 345/161, 156, 157, 163; 200/6 A

(56) References Cited

U.S. PATENT DOCUMENTS

| | | | | |
|---|---|---|---|---|
| 3,956,618 A | * | 5/1976 | Gotz | 324/207.23 |
| 4,459,578 A | | 7/1984 | Sava et al. | 338/128 |
| 4,639,667 A | * | 1/1987 | Andresen | 324/208 |
| 4,654,576 A | | 3/1987 | Oelsch et al. | 322/3 |
| 4,825,157 A | * | 4/1989 | Mikan | 324/208 |
| 5,004,871 A | | 4/1991 | Purcell | 178/18 |
| 5,168,221 A | | 12/1992 | Houston | 324/207.13 |
| 5,589,828 A | * | 12/1996 | Armstrong | 200/6 A |
| 2001/0055002 A1 | * | 12/2001 | Endo | 345/156 |

FOREIGN PATENT DOCUMENTS

| | | |
|---|---|---|
| DE | 4211 89 A | 10/1993 |
| EP | 0 526 015 A1 | 2/1993 |
| JP | 9218744 A | 8/1997 |
| WO | WO 93/20535 | 10/1993 |

* cited by examiner

Primary Examiner—Jay Patidar
(74) Attorney, Agent, or Firm—Salter & Michaelson

(57) ABSTRACT

A three dimensional positional device which may be used with a computer to enable, for example, a cursor to be moved in three dimensions. The device includes a movable portion (64) and a stationary portion (61). Movement of the movable portion (64) is translated into the movement of three Hall effect devices (69, 77, 81) in three orthogonal directions, relative to three magnetic systems (67, 72, 82). The movable portion (64) may be moved in a plane and pivoted relative to the stationary portion (61).

9 Claims, 9 Drawing Sheets

THREE DIMENSIONAL POSITIONING DEVICE

The present invention relates to a positional device which will provide three electrical signals proportional to the movement of a portion of the device in three dimensional space, i.e. proportional to the three coordinate axes x, y and z defining that position, and particularly although not exclusively to a device for use in conjunction with a computer to enable the movement of a cursor or object in the x-y and z directions as represented on a computer monitor.

Conventional arrangements used with computers to locate the precise position of a cursor on a screen (as in the Xerox Corporation "mouse") are capable only of providing a signal relating to movement in two dimensions. It is known that existing mouse type positioning devices and also similar two dimensional positioning devices such as touch screens, light pens, etc. are often inaccurate, difficult to use, ergonomically tiring, often restrictive in use and particularly in the case of the mouse, prone to degradation through the accumulation of dust and dirt.

Existing positional devices for computers are known, where a signal relating to position is determined by the interaction of a Hall effect device with a magnetic field. Hall devices are a known method of determining magnetic field strength, they depend on the interaction of a magnetic field on the current carried in a conductive material, typically a thin layer of a semiconductor. We refer to the Hall effect, first discovered by E. H. Hall in 1878 and the technology subsequently refined since then.

The principal features of the Hall effect are that the incidence of a magnetic field (B-field) on a current carrying conductor yields a Hall voltage, proportional to B. This Hall voltage is a maximum when the B-field and conductor surface are orthogonal.

Now, any magnetic field exists in three dimensions and a system of Hall devices located near a point in magnetic space will give Hall voltages which are a unique function of that point in magnetic space. If a system of magnets are used to develop a particular spatial magnetic field configuration and this system is mobile, relative to a system of Hall probes, then the Hall voltages generated in these Hall devices will, after processing, define the position of the magnetic system.

A number of patent applications have utilised this approach, in particular the following:

U.S. Pat. No. 4,459,578 Jul. 10, 1984
U.S. Pat. No. 4,639,667 Jan. 21, 1987
U.S. Pat. No. 4,654,576 Mar. 31, 1987
U.S. Pat. No. 4,825,157 Apr. 25, 1989

A disadvantage with this approach is the looseness, ambiguity and lack of precision of the geometric centre of such a magnetic assembly. Other disadvantages are the smallness of the B-field, the difficulty of flux concentration and that the movement of magnets generates circulating currents in the magnetic material creating additional fields superimposed on the main ones. A practical disadvantage is that such a magnetic sensor is often large and very bulky. The use of large magnets may also necessitate the use of shielding to prevent the magnetic field generated from interfering with magnetically sensitive equipment.

Another existing arrangement is described in WO 93/20535. This arrangement takes the form of a joystick and comprises a body including an end wall in which is secured a resilient arm. The resilient arm has secured to its top a tube and a handle. The tube surrounds the arm and mounts an annular magnet at the level of a pivot point, about which the arm flexes. The outputs of four Hall effect probes are affected by the position of the magnet to give an indication of the position of the arm, in two dimensions. The angular position of a, second, rotary handle is sensed by way of a further magnet which is connected for movement with the handle relative to further Hall effect probes.

Another use of a Hall effect device is disclosed in U.S. Pat. No. 5,004,871 which describes a stylus of a type suitable for use with a computer. The stylus has a pressure sensitive switch which may comprise a magnet and a Hall effect device mounted for movement relative to each other.

There are also a number of existing three dimensional positional devices available, for use in conjunction with computers. These devices use a variety of methods for generating a signal which relates to movement in three dimensions, including the use of gyroscopic systems to determine the movement of a device in space, electro-optical systems and in one device the use of strain gauges to determine the movement of a portion of the device relative to the remainder of the device. Existing three dimensional positional devices are expensive and/or imprecise, awkward and tiring to use, and in some cases physical constraints limit the use of the device.

An object of the present invention is to provide a three dimensional positional device which is convenient, simple and accurate and will, when used as an input device for a computer, enhance the capabilities of existing and future software technology and allow the exploitation of new more powerful computers.

Additional devices are foreseen for use with computer games, medical, computer graphics, virtual reality, robotics, security, teaching and other consumer and industrial applications.

According to a first aspect of the present invention there is provided a three dimensional positioning device comprising three Hall effect devices mounted on movable supports and three associated means for producing a magnetic field mounted on stationary supports adjacent but displaced from the movable supports.

Preferably the three magnetic systems are unconnected and unrelated. The magnetic systems each preferably comprise two magnets arranged in repelling mode polarity and the Hall effect devices are arranged to move between the opposed magnets. In this arrangement the Hall voltage measured will correspond to the position of the device between the two magnets, being a positive maximum when the Hall device is adjacent to one of the magnets and a negative maximum when the device is adjacent to the opposite magnet. The magnets preferably comprise small Nd.B.Fe Rare Earth magnets of high coercivity although they could comprise any other suitable magnetic material. The Hall devices are preferably comprised of conventional commercially available semiconductor Hall chips, although they could be effected by highly sensitive two dimensional electron gas (2DEG) Hall devices.

The three Hall devices and associated magnets are preferably mounted in a body having the appearance of the familiar two dimensional positional device, the mouse, but arranged to furnish three dimensional movement achieved by movement of the cover of the device with respect to its base. Movement of the three Hall devices may be proportional to the components of the movement of the cover of the device with respect to its base in three orthogonal directions. Springs may be employed to return the Hall devices to predetermined positions relative to their associated magnets when no external forces are applied to the device. Preferably the distance between any of the three positional modules (each comprising two opposed magnets and an associated Hall device) is greater than the distance between the opposed magnets of any one of the modules, more preferably the distance between any of the modules is at least twice the distance between the opposed magnets of any one module. The Hall voltages are preferably measured using conventional commercially available electronics and encoded for onward transmission to a computer by wire or by infra red or radio transmission, in which case the power supply for the device is preferably provided by means of a rechargeable battery and means for recharging this battery is provided integrally with the equipment that the positional device is intended for use with. The encoded information relating to the three Hall voltages is preferably processed by means of driver software which serves to move a cursor or object on the computer monitor in response to the signals received from the positional device, for example movement in two dimensions can be represented by movement of an object across the surface of a two dimensional screen and movement in a third dimension by changing the size of that object, although there are other possible ways that movement in three dimensions can be represented. The way in which the object controlled by the mouse behaves in response to movement of the positional device is also governed by its driver software and can be tailored to suit the application for which the positional device is to be used. Preferably movement of the cover of the positional device in a direction, for example sliding the cover in the x direction, causes the object controlled by the device to accelerate in that direction on the computer monitor and returning the device to the original position, or releasing one's grip on the device, causes the object to stop moving. Also, the cover of the mouse type device preferably incorporates buttons, similar to the conventional two dimensional mouse, to provide additional input to software and could also, for example, enable the device to be used for input of six degrees of freedom, i.e. movement along and rotation about three orthogonal axes.

It will be appreciated, however, that other embodiments are possible, for example where a system of Hall effect devices are arranged, with appropriate mechanical linkages, in different device bodies. Examples of other possible embodiments include a joystick, single handed device, two handed or multi-user device and also location and motion detectors for industrial use.

According to a second aspect of the present invention there is provided a three dimensional positional device comprising a stationary portion and a movable portion wherein movement in two dimensions is effected by moving the movable portion in a plane relative to the stationary portion and movement in a third dimension is effected by pivoting the movable portion relative to the stationary portion.

Preferably, the axis about which the movable portion may be pivoted is parallel to the plane. Preferably, where movement of the movable portion in the plane is resolved into two axes, possibly for onward transmission, then the axis about which the movable portion may be pivoted is parallel to one of the two axes in the plane. Where movement in the plane is resolved into orthogonal axes, say x and y axes, then the movable portion may preferably be pivoted about an axis parallel to one of those axes, say the x-axis.

Where movement of the movable portion is encoded for onward transmission to a computer, or other device, then it is preferable that movement of the movable portion in the plane represents movement in the x-y plane and pivoting of the movable portion represents movement in the z direction, orthogonal to the x-y plane.

Movement of the movable portion relative to the stationary portion is preferably measured by means of a magnetic system comprising a Hall device or devices and means for producing a magnetic field, although any other suitable means may be employed, for example switches or an optical system. The Hall device or devices are preferably mounted on a movable support or supports and the means for producing a magnetic field mounted on a stationary support or supports, adjacent but displaced from the movable support (s). The movable supports are preferably linked to the movable portion of the device. The means for producing the magnetic field preferably comprises a permanent magnet or magnets, for example small Nd—Be—Fe Rare Earth magnets.

Preferably there are provided three Hall effect devices, movable relative to three unconnected and unrelated magnetic systems, as hereinbefore described. Two of the magnetic systems are preferably arranged to measure movement of the movable portion in each of two orthogonal directions in the plane and the third magnetic system the extent to which the movable portion is pivoted relative to the stationary portion.

In one embodiment two of the three Hall effect devices are mounted on slides, so arranged within the body of the positional device so that movement of the cover with respect to the base of the device results in the movement of the Hall devices relative to their associated magnets.

The remaining Hall device is preferably mounted on a pivoting member, arranged to move with the movable portion of the device, and its associated magnets are mounted on the stationary member. The slides may be connected directly to the movable portion, or by way of a connecting rod and pivot arrangement. A bearing or bearings may be disposed between the movable and stationary positions, to facilitate their relative movement. A resilient means, for example return springs may be disposed between the movable and stationary portions, to return the two portions to a predetermined relative position when no external force is applied.

The device preferably has the appearance of a conventional 'mouse' device, the movable portion being comprised in the cover and the stationary portion being comprised in the base. The device may be arranged so that the movable portion may be pivoted about more than one axis, to allow for the input of additional degrees of freedom.

The present invention affords a number of advantages over the prior art, the use of static magnets eliminates the generation of eddy currents in nearby metallic members and hence additional magnetic fields generated by those currents and consequent errors in signals produced by the device. The use of a magnetic system is advantageous over those prior art devices which employ mechanical means for determining position, as magnet systems do not involve moving contacts they are unaffected by the accumulation of dust and dirt.

A means to exclude dust and dirt, for example a flexible skirt, may be disposed between the movable and stationary parts of the positional device.

Where a device may be used to provide two dimensional movement through sliding of a portion relative to another, and movement in a third dimension by pivoting, this provides a less ergonomically tiring arrangement than many prior art devices. The user may rest their hand on the device in use rather than having to raise or lower a portion of the device involving lifting their hand and arm. The provision of return to zero springs and more particularly variable rate return to zero springs can improve the feel of the device. Alternatively an actuator or actuators could be employed by counter movement of the device to give additional feed back to the user.

Referring, in particular, to the mouse type configuration, in use this embodiment is static relative to its surroundings in contrast to existing "mouse" positioning devices which are mobile, this reduces the incidence of repetitive strain injury resulting from use of the device.

The use of three similar positional modules within the device results in a system which is easy and cheap to assemble. The three positional modules are small relative to the body of the device, particularly the distance between the two opposed magnets of each module is less than the distance between the separate modules, this reduces magnetic interference between the three modules and also the generation of external magnetic fields, this eliminates the need for shielding to prevent interference with outside, magnetically sensitive equipment.

In order that the invention be more clearly understood there are now described embodiments thereof, by way of example, with reference to the accompanying drawings in which.

Figure 1:
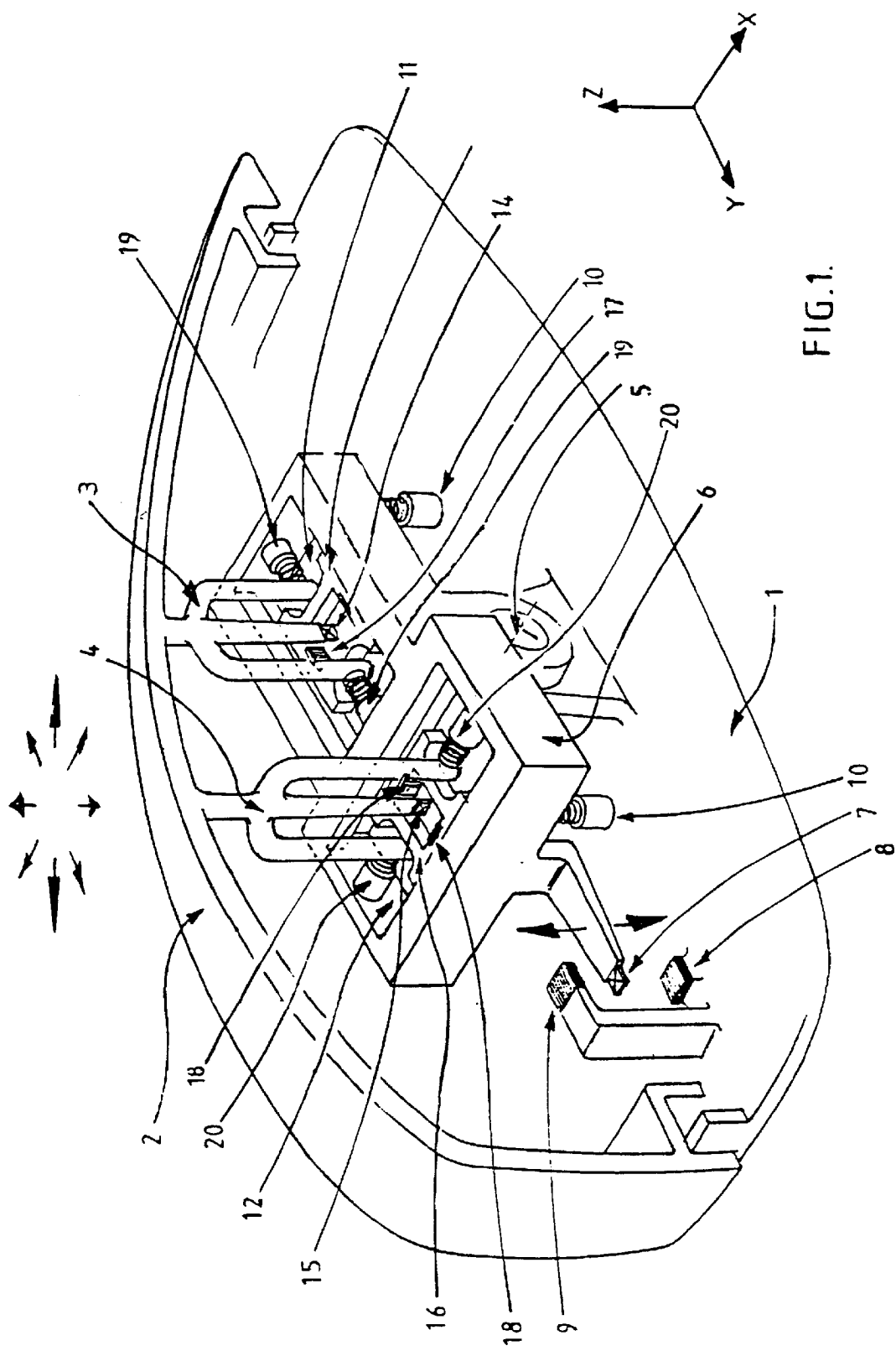
FIG. 1 shows a cutaway, perspective view of a first embodiment of a three dimensional mouse type positional device.

Referring to FIG. 1 there is illustrated a positional device. For reference purposes and to aid clarity, there are also marked the directions of three coordinate axes, x-y and z. The body of the device is comprised of a base 1 and a cover 2. At the interface between the periphery of the base 1 and cover 2 there is provided sufficient clearance to allow the cover 2 to be moved a predetermined amount in the horizontal (x-y) plane, and also to be pivoted about an axis parallel to the x axis, relative to the base 1.

Attached to the cover 2 are two forked formations, the x-fork 3 and the y-fork 4. Both the forks are comprised of three parallel prongs of circular cross-section. The prongs of the x-fork 3 are aligned along the y-direction, the prongs of the y-fork 4 are aligned along the x-direction, as marked on the reference axes on the diagram. The x and y directions are orthogonal. Attached to the end of the central prong of each forked member there is a Hall effect device. Attached to the central prong of the x-fork 3 is the x-Hall effect device 14, the x-Hall device 14 is comprised of a conventional semiconductor Hall chip, formed from a substantially flat rectangular piece of semiconductor material, the plane of which is aligned approximately with the y,z plane. Similarly, there is attached a Hall effect device to the y-fork 4, this y-Hall effect device 15 is similar to the x-Hall effect device 14 although it is aligned approximately with the x,z plane.

The x-fork 3 and the y-fork 4 are engaged respectively with the x-slide 13 and the y-slide 16.

Attached to the base 1, by means of a pivot 5, is a structure, the z-pivoting member 6, arranged to pivot about an axis parallel to the x-axis. Secured to a projecting portion of the z-pivoting member 6 is the z-Hall probe 7. The z-Hall probe 7 is fixed relative to the z-pivoting member 6 and arranged to move between the two z-magnets 8,9 one of which 8, is secured to the base 1. The second magnet 9 is secured to a projecting tab, formed into the base. The z-magnets are arranged in repelling mode polarity, and comprise rare earth magnets, for example Nd—B—Fe.

The base 1, cover 2, forks 3 and 4 and z-pivot are preferably constructed from a plastics material.

Located between the z-pivoting member 6 and base 1 are two z-return springs 10, they are arranged to move the z-pivoting member 6 to a position where the z-hall probe 7 lies midway between the z-magnets 8 and 9, when no external forces are applied to the system. Formed into the z-pivoting member 6 are two recesses, the x-recess 11 and the y-recess 12.

Referring to the x-recess 11, there is slidably mounted in this recess the x-slide 13. The x-slide is able to slide in the y-direction, relative to the z-pivoting member 6.

Similarly there is provided a y-slide 16, slidably mounted into the y-recess 12 and movable with respect to the z-pivoting member 6 in the x-direction.

The x and y-slides are provided with central apertures, magnets are secured into the opposite ends of each aperture, arranged in repelling mode polarity. The x-magnets 17 are opposed along a line in the x-direction, the y-magnets 18 are opposed along a line in the y-direction.

The x-fork 3 and the y-fork 4 extend into the x and y recesses 11,12 formed through the z-pivoting member 6 and engage with the x-slide 13 and y-slide 16 respectively.

Between the outer prongs of the x-fork 3 and side of the x-recess 11, there are disposed x-return springs 19, arranged to return the x-fork 3 to a predetermined position in the x-recess 11, when no external forces are applied, so that the y-Hall effect device 15 lies midway between the v-magnets 18.

Similarly y-return springs 20 are disposed between the y-fork 4 and the y-recess 12, so as to return the x-Hall effect device 14 to a mid-position between the x-magnets 17, when no external forces apply.

The return springs are constructed from Beryllium Copper, a nonmagnetic material.

Although not shown, the Hall effect devices are connected to a suitable power supply which supplies a direct current. The Hall devices are also connected to monitoring equipment able to monitor the Hall voltages to determine the position of the Hall effect devices between their associated opposed magnets. The information regarding the position of the three Hall devices is conveyed to appropriate electronics, for onward transmission to a computer.

In use the cover of the device 2, is moved with respect to the base 1. If the cover 2 is slid in an x-direction relative to the base, the effect is to move the x-Hall device 14 relative to the x-magnets 17. Similarly, sliding the cover relative to the base in a y-direction results in movement of the y-Hall effect device 15 relative to the y-magnets 18. Pivoting the cover 2 with respect to the base 1 results in the pivoting of the z-pivoting member 6 and the movement of the z-Hall effect device 7 between the z-magnets 8 and 9.

This movement of the cover 2 with respect to the base is effective to move three Hall effect devices in three orthogonal directions, the position of the Hall effect devices enables an electrical signal relating to movement in three dimensions to be generated. This would, for example with the use of appropriate driving software be able to allow the movement of an object or cursor in three perceived dimensions on a computer screen.

Figure 2:
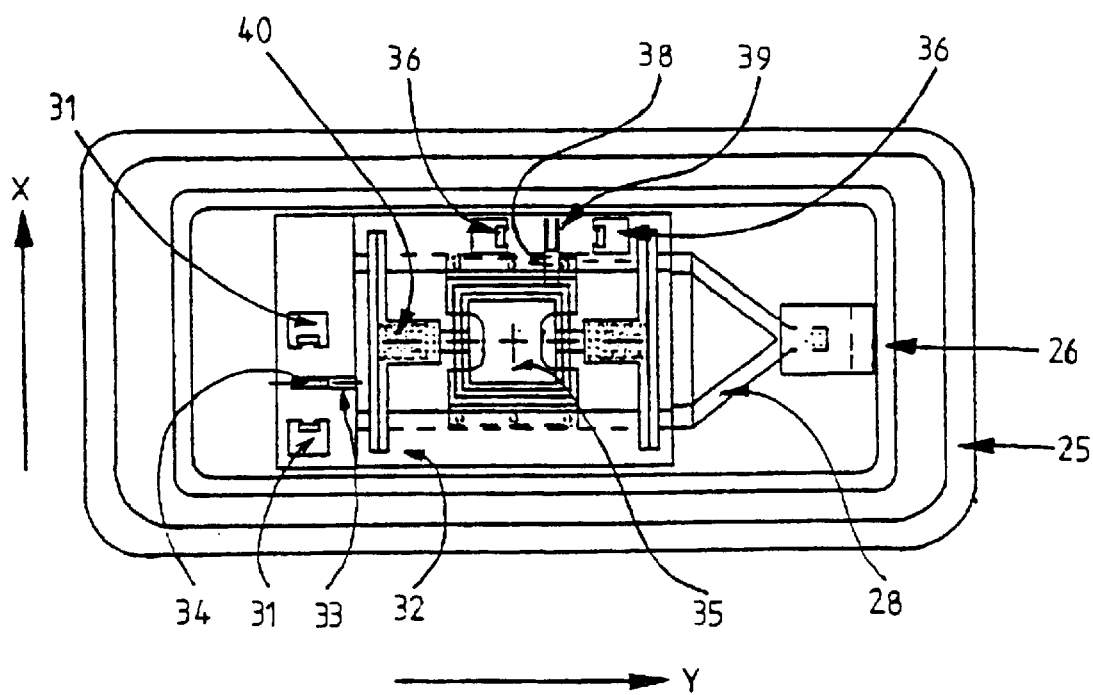
FIG. 2 shows a cross-sectional plan view of a second embodiment of a three dimensional mouse type positional device.
Figure 3:
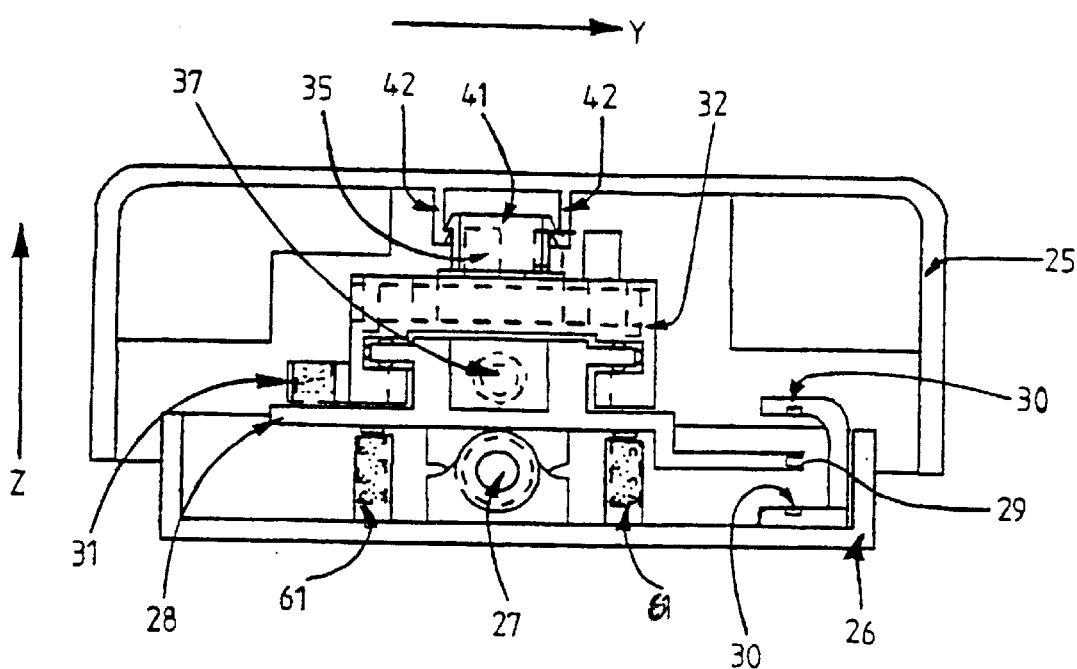
FIG. 3 shows a longitudinal cross-sectional view of a positional device, of the type illustrated in FIG. 2.
Figure 4:
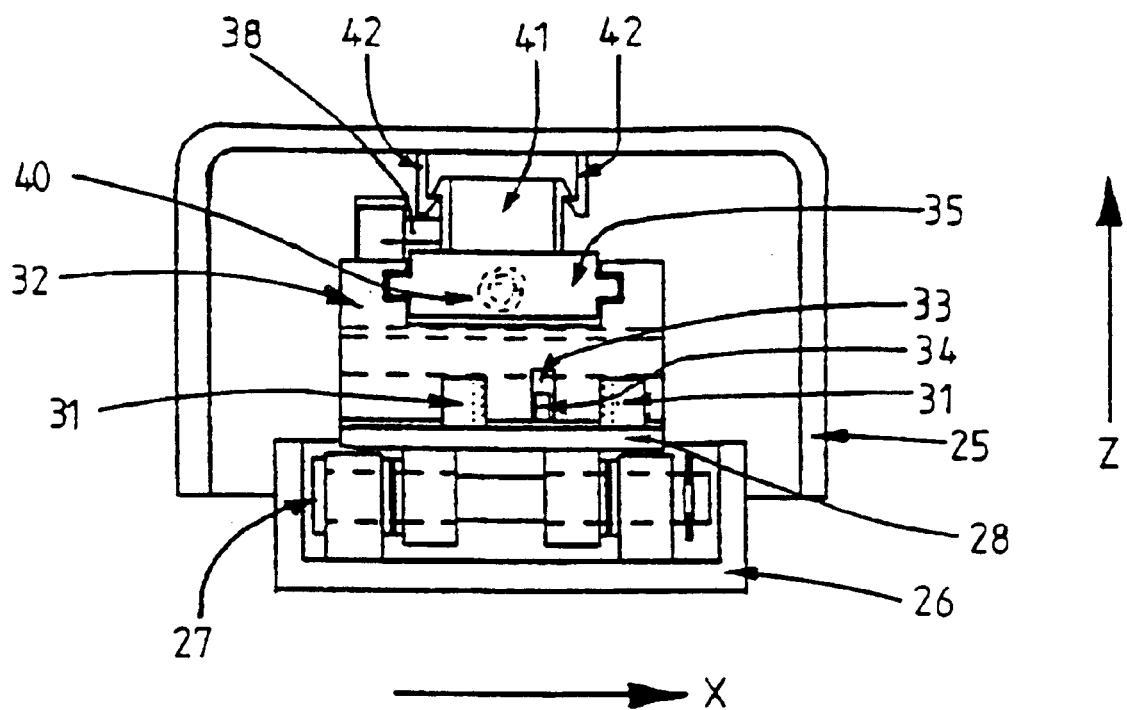
FIG. 4 shows a transverse cross-sectional view of a positional device, of the type illustrated in FIGS. 2 and 3.
Figure 5:
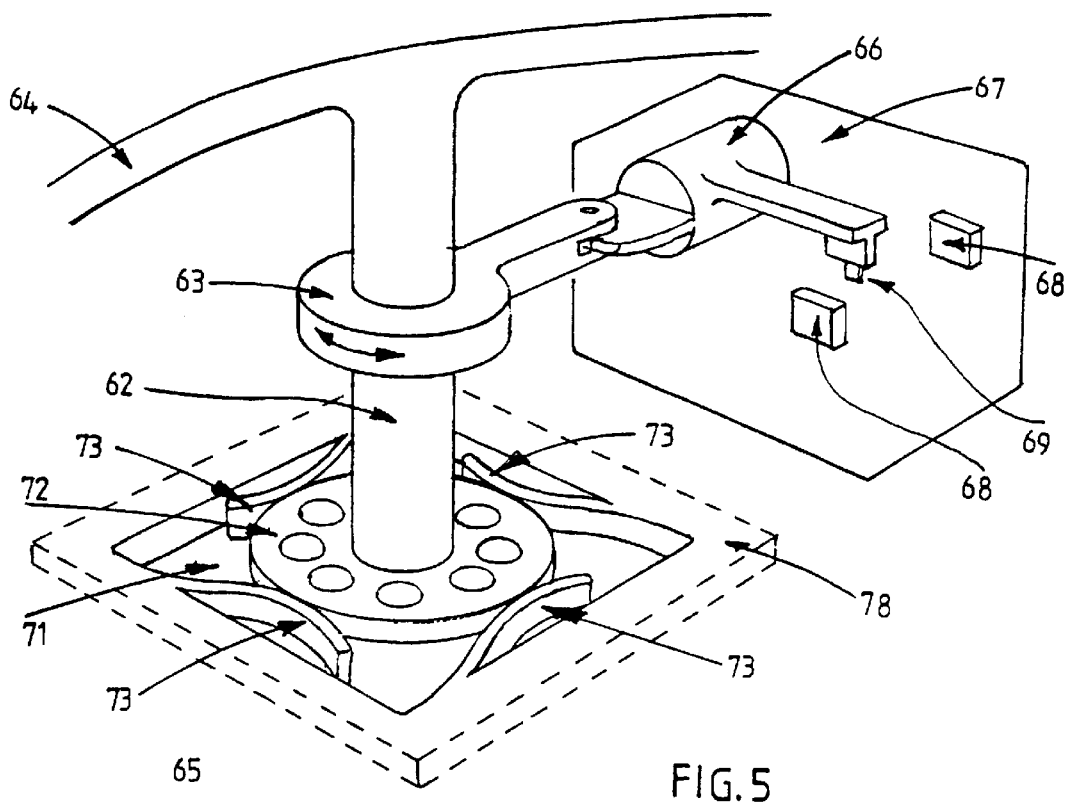
FIG. 5 shows a partial cutaway schematic view of a third embodiment of a three dimensional mouse type positional device.
Figure 6:
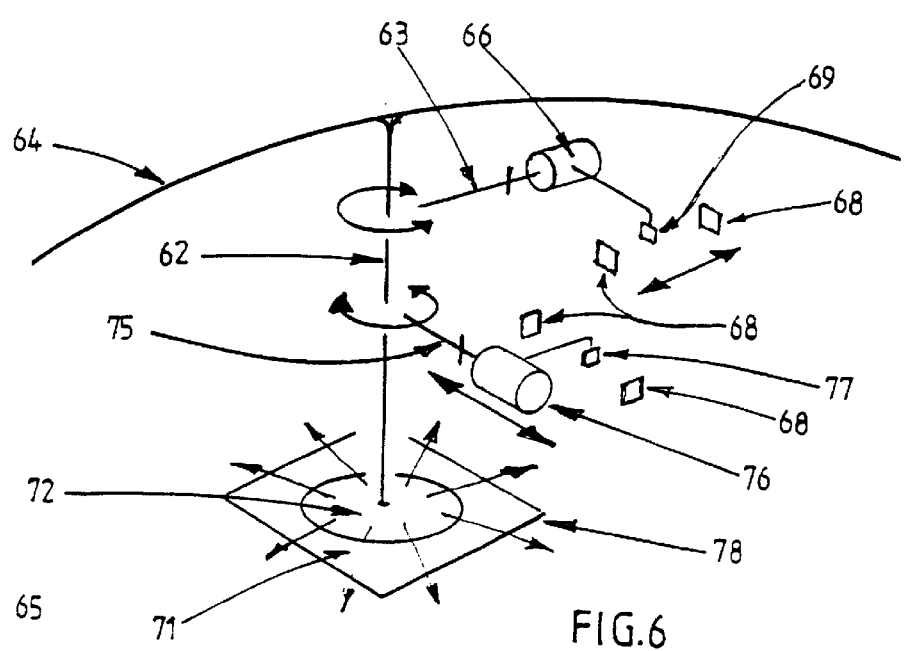
FIG. 6 shows a similar view to FIG. 5 with both x and y magnets shown.

Referring to FIGS. 2, 3 and 4 there is illustrated an alternative embodiment of the present invention, also having a cover 25 and a base 26.

Attached to the base by means of a pivot 27 there is a pivoting member 28.

Again, for clarity the drawings are marked with the three coordinate, x-y and z directions. The pivoting member is arranged to pivot about the x-axis.

The pivoting member 28 has affixed to one end thereof a Hall effect device 29, which moves between two opposed rare earth magnets 30. The pivoting member 28 is supported by two springs 61, these springs serve to return the pivoting member 28 to a position where the Hall effect device 29 lies in a predetermined position between the magnets 30, which are mounted, fixed, relative to the base 26. Attached to the pivoting member are a second pair of magnets, the x-magnets 31. These magnets are mounted in formations produced from the same material as the pivoting member 28 and arranged so as to be in repelling mode polarity. The magnets 30 and 31 comprise rare earth magnets, for example Nd—B—Fe.

Slideably mounted to the pivoting member 28 there is the x-slide 32, arranged to be able to slide with respect to the pivoting member 28 in the x-direction.

Forming part of the x-slide 32 there is an arm 33 to which there is attached a Hall device 34, movement of the x-slide 32 relative to the pivoting member 28 results in movement of the Hall device 34 relative to the x-magnets 31.

Mounted on the x-slide 32 are two magnets 36, similar to magnets 31, also placed in repelling mode polarity. Also, there are provided two return springs 37 bearing on both the x-slide 32 on pivoting member 28 and arranged to move the x-slide 32 relative to the pivoting member, to a predetermined position when no external forces are applied to the device. Typically in order that the Hall effect device 34 lies midway between x-magnets 31.

Further there is slidably mounted to the x-slide 32, a y-slide 35 movable in the y-direction relative to the x-slide 32.

Projecting from the y-slide 35 there is an arm 38 to the end of which there is affixed the y-Hall effect device 39. The arm 38 is arranged in order that the y-Hall effect device 39 moves between magnets 36 in response to movement of the y-slide 35, relative to the x-slide 32. Further, placed at opposite ends respectively of the y-slide 35 between the y-slide 35 and projecting portions of the x-slide 32 are return springs 40, arranged to return the y-slide 35, when no external forces are applied, to a predetermined rest position with respect to the x-slide 32. Typically, so as to return the y-Hall effect device 39 to a mid-position between the y-magnets 36.

The uppermost part of the y-slide 35, labelled 41 is of a square cross-section and has a projecting lip. The underside of the cover 25 also has a projecting portion 42, which cooperates with the uppermost part of the y-slide 41. This arrangement enables the cover to be fitted to the y-slide with a "snap-fit", in order that movement of the cover results in movement of the y-slide.

The device body and slides are constructed from a non-magnetic plastics material, the return springs are constructed from Beryllium Copper.

Movement of the cover 25 relative to the base 26, either by sliding the cover in the x-y plane or tilting the cover about an axis, parallel to the x-axis, results in corresponding movements of the x-y and z-Hall effect devices relative to their associated magnets.

Referring to FIGS. 5 to 9 there is shown a further embodiment of a positional device according to the invention. This embodiment also includes a base 61 and cover 64, the cover includes three buttons 74, the shape of the cover 64 is ergonomically designed to facilitate comfortable operation with one hand. The opposite end of the cover 64 to that which includes the switches provides a surface on which the user may rest their wrist when using the device. In comparison with the other embodiments described above, this embodiment includes a mechanical linkage arranged to translate movement of the cover 64 with respect to the base 61 into the movement of three Hall effect devices with respect to three pairs of stationary magnets. In this embodiment the cover 64 is connected to a shaft 62. Mounted rotatably on the shaft are two connecting rods, the x-connecting rod 75 and the y-connecting rod 63. The connecting rods 75 and 63 are pivotally connected to the x and y pistons 76 and 66. The pistons are in turn connected to x and y Hall chip holders 77 and 69 respectively.

The pistons are slidably mounted in piston blocks 67 which include means to enable two permanent magnets 68 to be mounted. The piston blocks 67 constrain the pistons 66 and 76 and hence the Hall chip holders 69 and 77 to move linearly between the magnets 68. The pistons 66 and 78 are illustrated as being circular in cross-section although they could take any other suitable form.

Mounted at the opposite end of the shaft 62 to the cover 64 is a thrust ring ball race 72. The thrust ring ball race 72 sits in an enclosed region 71 formed by barrier 78 which is formed on the chassis 65. The thrust ring ball race 72 is retained within raised portion 78 by ball race cover 79 which engages with the barrier 78 with a snap-fit. The thrust ring ball race 72 enables the cover 64 to move laterally with respect to the base 61, by a limited amount. When the cover is so moved the x and y pistons 76 and 66 respectively are moved in the x and y directions by the x and y components of the motion of the cover.

Also mounted within the raised portion 78 are four return springs 73 which act to centralise the thrust ball race 72 in the recess 71 when no force is applied. When the thrust ball race 72 is centralised then, both the x and y Hall chip holders 77 and 79 are aligned approximately midway between their respective magnets.

Figure 7:
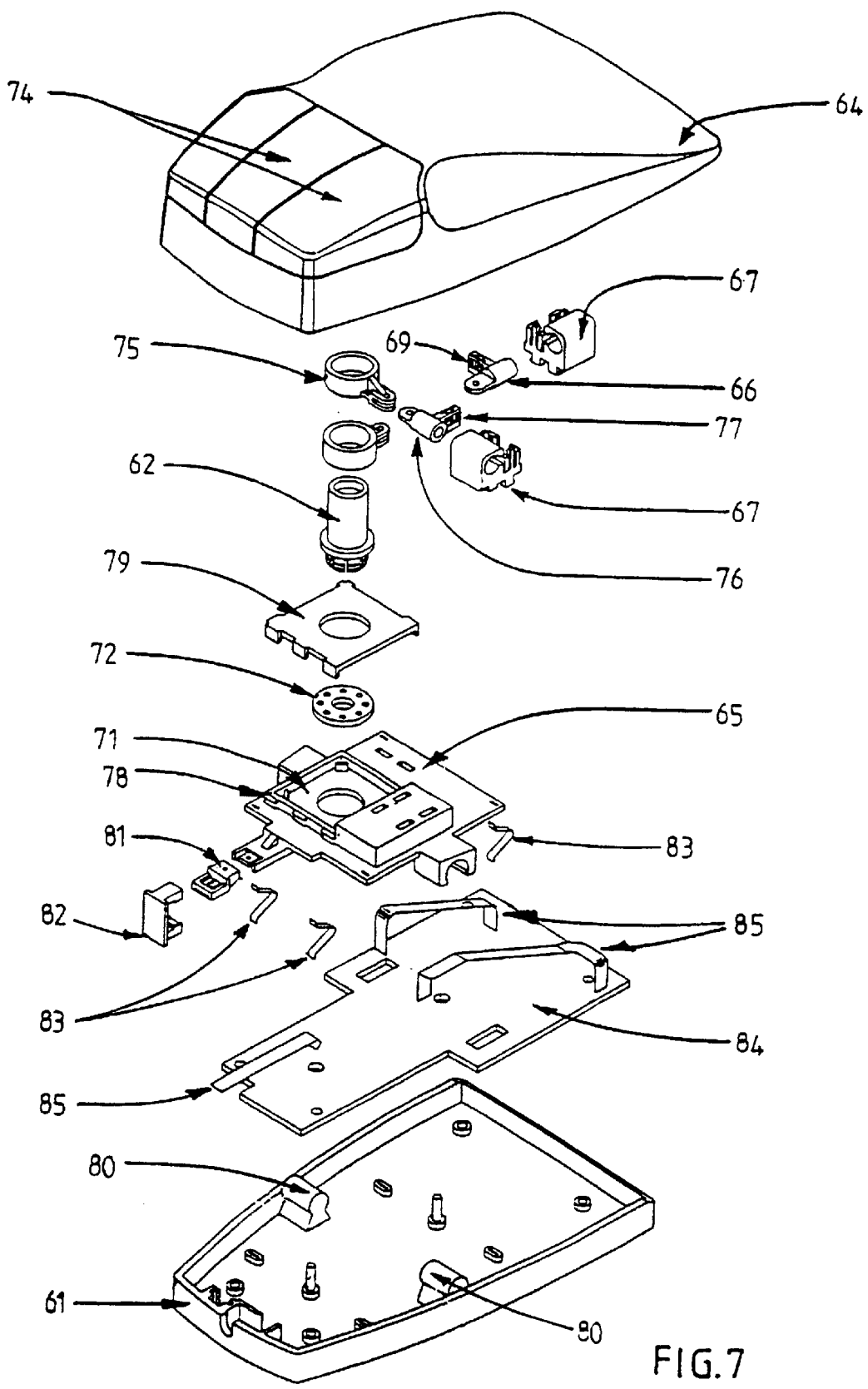
FIG. 7 shows an exploded view of the positional device of FIGS. 5 and 6.
Figure 8:
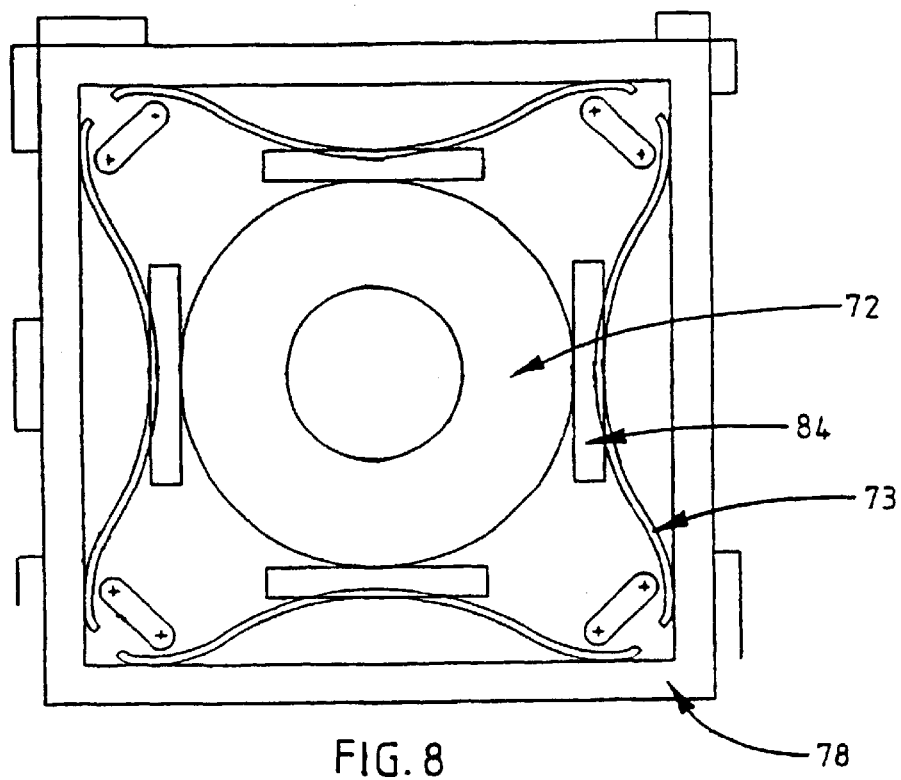
FIG. 8 shows a plan view of the 'z' chassis of the device of FIGS. 5 to 7.
Figure 9:
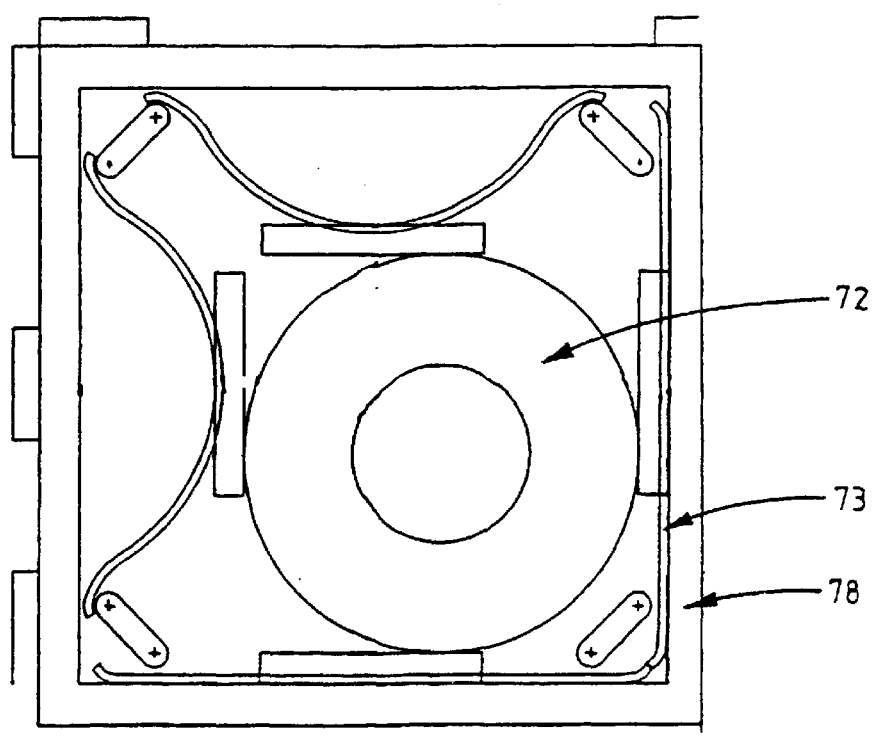
FIG. 9 shows a similar view to FIG. 8, where the thrust ball race has been displaced from the central position.

An alternative return spring arrangement to that illustrated in FIG. 7 is illustrated in FIGS. 8 and 9.

In the arrangement illustrated in FIG. 8 the return springs 73 are supplemented by pressure bars 84. The springs 73 act to centralise the thrust ball race 72 within the area defined by raised portion 78, when no pressure is applied, that is, a return to zero function. FIG. 9 shows a similar view to FIG. 8 but with the thrust ball race 72 displaced from the central position.

The ball race arrangement allows the cover 64 to be smoothly moved with respect to the base 61. The return springs give the cover 'feel', in that the user is required to move the cover against spring pressure to register movement of a cursor on a computer screen, for example.

The return springs 73 may be variable rate springs, arranged to provide only a low force against any initial movement, but to provide an increased force when the ball thrust race 72 is displaced further.

The x and y piston blocks 67, recess 71 and ball thrust race 72 are all mounted on the z chassis 65.

The z chassis 65 is pivotally mounted onto the base 61 by engaging formations 79 and 80. A z-axis Hall chip holder 81 is also mounted onto the z chassis 65 and a z magnet holder 82 for holding two opposed magnets is mounted on base 61. Disposed between the z chassis 65 and base 61 are four z-return springs 83 which serve to return the z-chassis to a position where the z Hall chip holder 81 lies approximately half-way between the two z magnets retained in the z-magnet holder 82, when no force is applied.

In a similar manner to the first and second described embodiments, the movement in the z-direction is effected by tilting the cover 64 with respect to the base 61, about an axis parallel to the x-axis. Tilting the cover 64 causes the z-chassis to pivot with respect to the base, against the z-return springs 83, and hence move the z Hall chip holder and the Hall chip retained therein with respect to the stationary magnets retained in the z-magnet holder 82.

Finally, there is also mounted on the base 61 a printed circuit board 84 on which is mounted appropriate circuitry (not shown) for the operation of the three Hall chips and buttons.

Also attached to the circuit board 84 are three chip ribbons 85 for electrical connection of the electronic circuit to the Hall chips.

All parts of the device, other than the magnets, are produced from a non-magnetic material, preferably a plastics material.

This embodiment provides a particularly smooth action, especially when the cover is moved in the z and y directions. Moreover the x and y chips are constrained by the x and y pistons 76 and 66 respectively to move in a linear path between their respective magnets. This leads to more accurate operation of the device.

Figure 10:
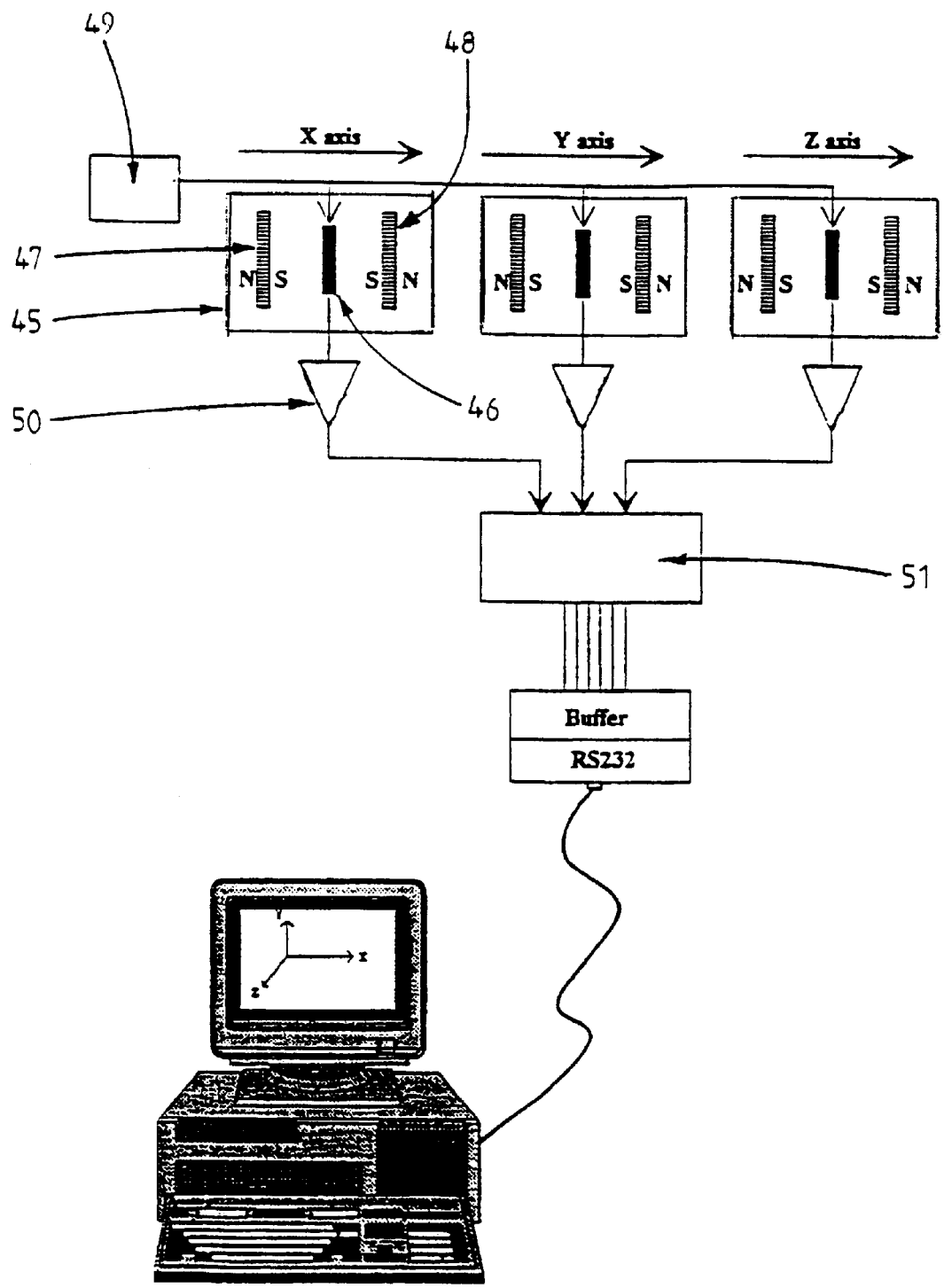
FIG. 10 shows a schematic representation of the electrical connection of the three Hall effect devices used in a positional device.

Referring to FIG. 10 there is a illustrated a representation of the Hall device and magnet positional arrangements, for the x-y and z axes, as used in the foregoing embodiments of positional devices.

Referring to the x-axis arrangement 45 there is illustrated a Hall effect device 46 and two magnets arranged in repelling mode polarity 47 and 48. The Hall effect device is able to move relative to and between the magnets 47 and 48. As the magnets are arranged in repelling mode, the Hall voltage measured across the Hall effect device 46 will be a maximum when the Hall effect device approaches one of the magnets and a negative maximum when the second magnet is approached. The Hall voltage measured will vary approximately linearly as the device is moved between the two magnets.

In use, each of the three Hall devices are connected to a power supply 49 which supplies a direct current, for example a battery. In addition, each device is connected to an amplifier 50, which produces a signal relating to the Hall voltage generated across the Hall effect device which relates to the position of the device.

The three signals relating to the positions of the x-y and z-Hall effect devices, relative to their corresponding magnets are supplied to a microprocessor 51.

The microprocessor converts the three Hall voltages into a signal suitable for processing by the driver software of a computer, which converts the position and movement of the Hall effect devices to the position and movement of a cursor or object on the computer screen. The behaviour of the cursor or object on the computer screen in response to movement of the cover of the position devices relative to its base is determined by the computer driver software. In the above embodiments the software is arranged so as to cause the cursor or object to accelerate in a given direction in response to the movement of the cover of the device relative to the base, in that direction. When pressure is released on the cover the return springs act to return the Hall devices to their predetermined rest position, which corresponds to a stationary cursor. This software enables the cursor to be rapidly moved to a point on the screen, the body of the mouse is then released and more accurate positioning of the cursor can then be achieved.

Figure 11:
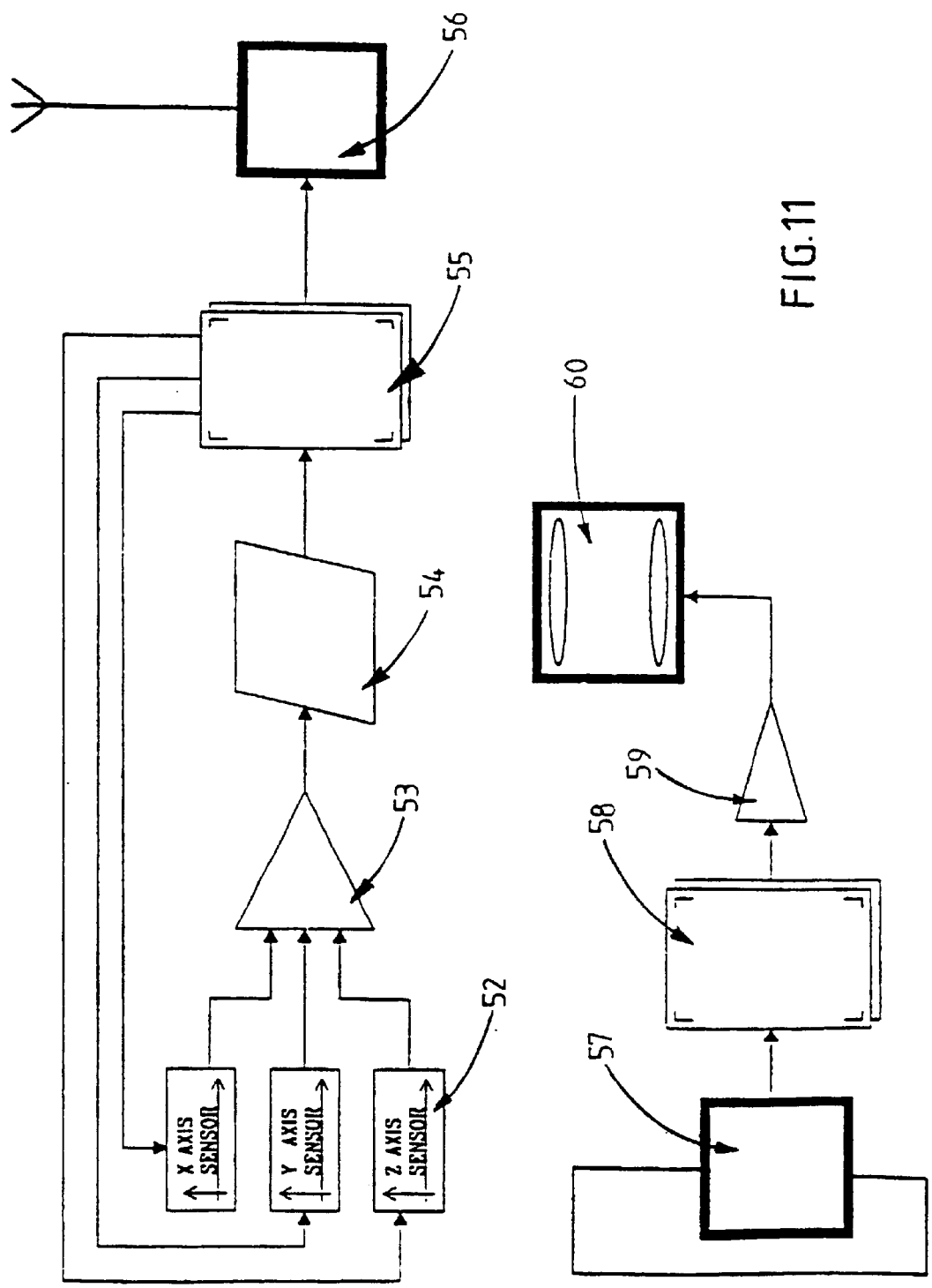
FIG. 11 shows an alternative implementation to the circuit arrangement illustrated in FIG. 10.

Referring to FIG. 11 there is illustrated an alternative arrangement for the electrical connection of three Hall effect devices. The signals from sensors 52 of the Hall effect device are fed to an amplifier 53 whose output is connected via an analogue to digital converter 54 and microcontroller 55 to a transmitter 56. On the receiving side, a receiver 57 is connected via a microcontroller 58 and buffer 59 to a computer 60.

In use both of the above embodiments are static relative to their surroundings. Use of the devices is achieved by the sliding and pivoting of the cover of the devices with respect to their bases. This arrangement is convenient to use and in comparison with existing positioning devices, more accurate and less likely to cause repetitive strain injury.

The above embodiments are described by way of example only, many variations are possible, without departing from the invention.

What is claimed is:

1. A three dimensional positioning device comprising three Hall effect devices mounted on movable supports, and three associated means for producing a magnetic field mounted on stationary supports adjacent but displaced from the movable supports wherein each means for producing a magnetic field comprises two spaced apart permanent magnets arranged in repelling mode polarity and each associated Hall device is constrained to move between two such magnets.

2. The positional device of claim 1, wherein the three Hall effect devices are movable in three orthogonal directions.

3. The positional device of claim 1, wherein at least one Hall effect device is mounted on a sliding member.

4. An input device for a computer comprising:
   a stationary portion;
   a movable portion mechanically connected to and moveable relative to the stationary portion; and
   means for detecting relative movement of the two portions and outputting a signal for transmission to a computer, the output signal representing movement in first, second and third orthogonal directions;
   wherein movement of the moveable portion is effected by sliding the movable portion in a plane relative to the stationary portion and by pivoting the movable portion relative to the stationary portion, wherein the movable portion is constructed and arranged to be pivoted about an axis which is parallel to the plane, and wherein movement of the moveable portion relative to the stationary portion in the plane causes the device to output a signal representative of movement in the first and second orthogonal directions, and pivoting the moveable portion relative to the stationary portion causes the device to output a signal representative of the movement in the third orthogonal direction.

5. The positional device of claim 4, further comprising a Hall effect device and a means for producing a magnetic field.

6. The positional device of claim 5, wherein the Hall effect device is mounted on the movable support and the means for producing a magnetic field is mounted on a stationary support, adjacent to and spaced apart from the movable support.

7. The positional device of claim 4, comprising three Hall effect devices and three associated means for producing a magnetic field.

8. The positional device of claim 7, wherein the three Hall effect devices are movable in three orthogonal directions.

9. A three dimensional positioning device comprising three Hall effect devices mounted on movable supports, and three associated means for producing a magnetic field mounted on stationary supports adjacent to the movable supports wherein each means for producing a magnetic field comprises two spaced apart permanent magnets arranged in repelling mode polarity and each associated Hall device is constrained to move between two such magnets.

* * * * *